United States Patent [19]

Ogawa et al.

[11] 4,251,548
[45] Feb. 17, 1981

[54] CHEWING GUM AND METHOD OF PREPARATION THEREOF

[75] Inventors: Koichi Ogawa, Tokyo; Shichigoro Tezuka, Kawasaki; Masatoshi Terasawa, Tokorozawa; Hisashi Ishikawa, Tokyo, all of Japan

[73] Assignee: Lotte Co. Ltd., Tokyo, Japan

[21] Appl. No.: 62,947

[22] Filed: Aug. 2, 1979

[30] Foreign Application Priority Data

Feb. 8, 1979 [JP] Japan .................................. 54/12803

[51] Int. Cl.³ .............................................. A23G 3/30
[52] U.S. Cl. ......................................... 426/3; 426/534
[58] Field of Search ......................................... 426/3–6, 426/534

[56] References Cited

U.S. PATENT DOCUMENTS

| | | | |
|---|---|---|---|
| 2,203,436 | 6/1940 | Kertess | 426/3 |
| 2,484,859 | 10/1949 | Snelling | 426/3 |
| 3,255,018 | 6/1966 | Comollo | 426/4 |
| 3,679,660 | 7/1972 | Magnus | 426/3 |
| 3,903,305 | 9/1975 | Bahoshy | 426/3 |
| 3,995,064 | 11/1976 | Ehrgott | 426/3 |

*Primary Examiner*—Jeanette M. Hunter

[57] ABSTRACT

A chewing gum comprising a conventional gum base, sweetening agents, conventional chewing gum additives and others and at least an amino-carbonyl reaction product is disclosed. The amino-carbonyl reaction product is incorporated into the chewing gum either through reaction of amino acids with sugars during preparation of the chewing gum base or through direct addition thereof upon preparation of the chewing gum per se.

13 Claims, No Drawings

CHEWING GUM AND METHOD OF PREPARATION THEREOF

BACKGROUND OF THE INVENTION

This invention relates to a chewing gum providing an improved sweetness and flavor and a method of preparing the same and more particularly to an improvement of the chewing gum with an amino-carbonyl reaction product.

As used herein, the term of "amino-carbonyl reaction" means a browning phenomenon, commonly known as Maillard reaction or melanoidine reaction caused between amino acids and sugars (especially reducing sugars).

As sweeteners for a chewing gum, hitherto have been used naturally occurring sugars such as sucrose, glucose, fructose, inverted sugar, maltose and others; sugar alcohols such as sorbitol, xylitol, maltitol and others for a sugarless chewing gum; and synthetic sweeteners such as saccharin, cyclamate, glycyrrhizin and others for strengthening sweetness. Recently, a new naturally occurring sweetener such as stebioside has been employed in view of the health reason and the sweentening quality. Further, it has been well-known that the naturally occurring sugar, especially sucrose or inverter sugar is most favorable in view of the sweetening quality or the fondness of sweetness, and sugar molasses or inverted sugar provides higher sweetness and better taste for foods than most pure granulated sugar.

In consideration of the health reason as described hereinbefore, however, have been produced various types of chewing gum products, for example so-called sugarless chewing gums which employ sorbitol, saccharin, glycyrrhizin, stebioside for strengthening deficient sweetness in limited amount of digestible natural sugars or utilize sugar alcohols for substitution of the natural sugars. Such substitution or strengthening might reduce or eliminate an intrinsic good taste of sugar in the chewing gum product. Thus, there is need for food additives which provide a good quality and taste of sweetness for a low-sugar or sugarless chewing gum.

In general, a heated flavor of sugar has been considered to appear due to a component showing a roasted sugar note, such as furfral which is formed by partial decomposition of sugar upon heat treatment. The roasted sugar note could be caused by reaction of sugars with amino acids as well. Maltol, which is well-known as a food additive, shows also the sugar note.

On the other hand, it has been well-known that a browning phenomenon or Maillard reaction occurs between sugars and amino acids to form furfral derivatives, N-Glycosides and reductants which in turn provide the unique taste for food.

For example, Kremers (1948) produced an imitation maple flavoring by heating sugars with α-aminobutyric acid, α-aminoisobutyric acid, serine, threonine, and other α-amino acids of three to six carbon atoms. Rusoff (1958) produced an artificial chocolate flavor by heating a reducing sugar with a glycyl or alanyl peptide at 130° C. for eight minutes. Bitterness was supplied by adding an alkaloid, such as theobromine or caffeine, and astringency was introduced by adding quebracho or chestnut tannins. General Foods Corporation (1963) made flavors resembling chocolate, coffee, or tea by autoclaving mixtures of wheat bran and peanut flour with sugar and water for only a few minutes near 200 pC. Morton and Sharples (1959) made a honey-flavored syrup by refluxing glucose with β-phenylalanine in water. This reaction was known to give a floral scent, like wilted roses (Ruckdeschel 1914), but they added invert sugar syrup containing citric and glutamic acids to enhance the honey flavor. Labahov and Kerebinski (1958) reported a mushroom-flavored mixture that was formed by heating glucose with sodium glutamate for 1.25 hr. at 195° C. A yeast-free, chemically-leavened "Instant Bread Mix," developed by the Quartermaster Corps for use by the Armed Forces, gave a good-textured bread that had only a raw, starchy taste. Flavor for the bread was easily synthesized, however, by use of the Maillard reaction. Ruckdeschel (1914) had shown that glucose and leucine when heated together produced a bready aroma. Kiely et al. (1960) added only 0.05 to 0.10% leucine to the Instant Bread Mix, which already contained glucose, and thereby produced by baking a toasted bread-like aroma. The further addition of histidine or arginine added buttery notes and gave the finished bread an acceptable flavor. Keeney and Day (1957) incubated milk protein hydrolyzates with pyruvic acid, isating, or ninhydrin for 18 hr. at room temperature and then distilled out cheese-like aromas. A small amount of such a distillate, when added to cottage cheese, produced a Cheddar-type flavor. These practical accomplishments are based on a fundamental chemical reaction that is only one part of the total Maillard complex.

The Maillard reaction product or amino-carbonyl product, however, has never been used for improving the quality of sweetness in the chewing gums, especially the sugarless chewing gums.

The inventors have now found out that if amino-carbonyl reaction product is formed in a chewing gum base in the presence of amino acids and sugars under the condition for preparing the gum base a chewing gum prepared from the gum base has an excellent quality of sweetness and a good taste.

This effect is more significant for the sugarless chewing gum using only sugar alcohols as sweeteners. Further, it has been found out that the effect is enhanced if the amino-carbonyl product is formed in the gum base in the coexistence of maltol and/or protein hydrolzate. As used herein, the term of "protein hydrolyzate" means a mixture of all amino acid compounds including various simple amino acids through oligopeptides to polypeptides formed by hydrolysis of protein.

In view of the result as described hereinbefore, the inventors have further found out that preparation of the amino-carbonyl reaction product separately from the gum base and its incorporation thereinto in a predetermined amount may also significantly improve the quality of sweetness and the flavor and taste. Similarly, in the case of separate preparation of the amino-carbonyl reaction product, the coexistence of maltol and/or protein hydrolyzate results in the enhanced effect.

SUMMARY OF THE INVENTION

Accordingly, a general object of this invention is to improve the quality of sweetness and the flavor and taste of chewing gum. This object may be achieved, in accordance with the invention, by incorporation of an amino-carbonyl reaction product into the chewing gum.

Thus, a principal object of the invention is to provide a chewing gum composition which comprises a conventional gum base including natural resins, vinyl acetate resins, polyisobutylene, ester gums, plasticizers, emulsifiers, fillers and others; an amino-carbonyl reaction product formed by reaction of sugars with amino acids; sweetening agents selected from sugars, sugaralcohols and/or synthetic sweeteners; and conventional additives including flavors, coloring agents and others.

In the chewing gum composition according to the invention, it is preferred to incorporate maltol and/or protein hydrolyzate in addition to the ingredients hereinabove described in order to strengthen the effect of improving the quality of sweetness and the flavor and taste of chewing gum.

In the chewing gum composition according to the invention, xylose is the most preferable and effective type of sugar for obtaining the amino-carbonyl reaction product.

Another object of this invention is to provide a method of preparing a chewing gum which comprises the steps of incorporating upon preparation of a chewing gum base a mixture of sugars with amino acids into conventional gum base materials comprised of natural resins, vinyl acetate resins, polyisobutylene, ester gums, plasticizers, emulsifiers, fillers and others, mixing and dissolving said mixture uniformly into said materials at the temperature of not higher than 150° C. while said sugars being reacted with said amino acids to form an amino-carbonyl reaction product, adding sweetening agents selected from sugars, sugaralcohols and/or synthetic sweeteners, conventional additives comprised of flavors, coloring agents and others, and kneading the whole mixture homogeneously at the temperature of approximately 40° to 60° C.

Still another object of the invention is to provide a method of preparing a chewing gum which comprises the steps of incorporating an amino-carbonyl reaction product independently prepared by reaction of sugars with amino acids into a chewing gum base which has been separately prepared from conventional gum base materials comprised of natural resins, vinyl acetate resins, polyisobutylene, ester gums, plasticizers, emulsifiers and others, mixing said amino-carbonyl reaction product with said gum base homogeneously at the temperature of approximately 40° to 60° C., adding sweetening agents selected from sugars, sugaralcohols and/or synthetic sweeteners, conventional additives comprised of flavors, coloring agents and others, and kneading the whole mixture.

In either methods of the invention described hereinbefore, the coexistence of maltol and/or protein hydrolyzate together with the amino-carbonyl reaction product gives the more improved chewing gum.

DESCRIPTION OF THE INVENTION

The gum base materials used in the invention include natural resins such as chicle, jeltong and the like, vinyl acetate resins butyl rubber, polybutene, polyisobutylene, ester gums, plasticizers such as micro-crystalline wax, emulsifiers such as monoglycerides, sorbitan esters and sugar esters, fillers such as calcium carbonate and talc, and may be used in conventional amount proportions.

The additives to be incorporated into the gum base upon preparation of the chewing gum include well-known sugars such as sucrose, inverted sugar, glucose, fructose, maltose and corn syrup; sugar alcohols such as sorbitol, xylitol, mannitol and malthitol; synthetic sweeteners such as saccharine, cyclamate, glycyrrhizin and dulcin; sweetening agents such as stebioside; flavors such as spearmint, peppermint, anise, cinnamon and lycoris; coloring agents; anti-oxidants; preservatives; drugs and others, and may be used in conventional amount proportions. The effect according to the invention, however, is more significant in a sugarless chewing gum in which sweetening agents other than sugars, for example sugar alcohols, are used.

An essential feature of the invention is to incorporate the amino-carbonyl reaction product into the chewing gum, which product may be either produced in the chewing gum base or added to the conventional gum base upon preparation of the chewing gum.

In one method according to the invention, in order to form the amino-carbonyl reaction product during preparation of the chewing gum base a mixture of amino acids and sugars may be compounded with various gum base materials as mentioned hereinbefore, and dissolved homogeneously therein at the temperature below approximately 150° C., preferably between 100° and 120° C. over the period of 30 to 120 minutes, under which conditions for preparation of the gum base the amino-carbonyl reaction occurs. Amino acids required for the amino-carbonyl reaction may be of any type, for example glycine, L-alanine, L-alginine, L-asparagine, L-aspartic acid, L-cystein, L-cystine, L-glutamic acid, L-glutamine, L-histidine, L-oxylysine, L-oxyproline, L-isoleucine, L-Leucine, L-lysine, L-methionine, L-phenylalanine, L-proline, L-serine, L-threonine, L-tryptophane, L-tyrosine, L-valine etc., although glycine, L-alanine or L-valine is preferred. The amino acid is used in the amount enough to produce 0.025 to 5.0% by weight, preferably 0.025 to 2.0% by weight of the amino-carbonyl reaction product based on the weight of final chewing gum product. The amount is generally in the range of 0.001 to 5.6% by weight based on the total weight of gum base, depending on the type of amino acids. The other component, sugar, required for the amino-carbonyl reaction may be of any type, for example glucose, maltose, oligo-saccharides, xylose, fructose, arabinose, ribose and others so far as the reaction of the sugar with the amino acid may produce the amino-carbonyl reaction product. Preferably xylose or glucose, more preferably xylose is used. An amount of sugar used for the amino-carbonyl reaction may be in the range of 0.0001 to 0.7% by weight of the total gum base, depending on the amount of the former component or amino acid, so as to produce 0.025 to 5.0% by weight, preferably 0.025 to 2.0% by weight of the amino-carbonyl reaction product based on the total weight of final chewing gum product. Upon preparation of the chewing gum base as described hereinbefore, if the gum base materials contain an appropriate amount of water the amino acid/sugar mixture may be simply added to the materials for causing the amino-carbonyl reaction, while an aqueous solution of the amino acid/sugar mixture is preferably employed if the amount of water is deficient in the gum base materials.

When the amino-carbonyl reaction product is formed during preparation of the chewing gum base, the coexistence of a well-known food additive, maltol (chemically referred to as 3-hydroxy-2-methyl-4-pyrone) or its isomers, enhances the resulting effect of the amino-carbonyl reaction product. Maltol is used in an amount ranging from 0.018 to 1.6% by weight based on the weight of final chewing gum product. The coextistence of protein hydrolyzate without or preferably in combination with maltol also enhances the effect of the amino-carbonyl reaction product. The amount of protein hydrolyzate used may be in the range of about 0.005 to 10% of the amount of amino acid used for the amino-carbonyl reaction, depending on the type of protein materials such as soy bean protein, gelatine or the like and the degree of hydrolysis. Excess hydrolysis of protein is not preferable because of the resulting high content of simple amino acids. For the purpose of the invention, the protein hydrolyzate containing mainly dipeptides and more larger oligo- and poly-peptides is preferred. The condition and degree of hydrolysis may be previously determined so as to achieve the appropriate effect of the invention by means of an amino acid analyzing technique such as thin layer chromatography.

In accordance with the other method of the invention in which the amino-carbonyl reaction product is prepared separately from the chewing gum base and is added thereto on preparation of chewing gum, the reaction product may be added either in the form of a concentrate or in dry form and either types of addition show the equal effect, provided that the concentrate should be added on the basis of dry substance. The raw materials and conditions for preparation of the amino-carbonyl reaction product may be same as in the amino-carbonyl reaction during preparation of the gum base, and most preferable materials, their amount to be used and conditions may be shown as follows:

| Protein Hydrolyzate | 50–90 parts by weight |
| Amino Acid, Glycine | 10–50 parts by weight |
| D-Xylose | 1–5 parts by weight |
| Maltol | Three to four times the total amount of the above materials (300–400 parts by weight) |
| Water | 400–600 parts by weight |

In accordance with the above recipe, 1 to 5 parts of D-xylose is reacted with 50 to 90 parts of protein hydrolyzate and 10 to 50 parts of glycine, then three to four times of maltol is added and thereafter the mixture is heated up to the water content of 50% and dried in air.

The amount of thus prepared amino-carbonyl reaction product added to the sugar containing chewing gum may be relatively large up to 5.0% by weight based on the weight of chewing gum since good sweetness and taste of sugar alleviate the astringency of amino-carbonyl reaction product. For the sugarless chewing gum, on the other hand, the amount over 2.0% by weight of amino-carbonyl reaction product could adversely affect the taste of chewing gum product because of the astringency of sweetening agents such as sugar alcohols. The amount below 0.025% by weight cannot provide little or no effect. Accordingly, the amount of amino-carbonyl reaction product to be added to the chewing gum may be in the range of 0.025 to 5.0% by weight, preferably 0.025 to 2.0% by weight.

In accordance with the invention, the chewing gum product is extremely improved in the quality of sweetness and the flavor and taste. Especially the typical cold feeling of sweetness, which represents the defect of the sugarless chewing gum, is effectively modified to resemble the good sweetness of sugar. Moreover, the amino-carbonyl reaction product has little or no influence on the physical property of chewing gum because of a trace amount (0.025 to 5.0%) of incorporation thereof.

The invention is illustrated with reference to the following examples.

EXAMPLE 1

Formation of the amino-carbonyl reaction product during preparation of the chewing gum base To the known gum base materials as shown in Table 1 were added xylose and a mixed solution of amino acids and peptides in the proportions as also shown in Table 1 and the amino-carbonyl reaction was allowed to occur at the temperature of not higher than 150° C. during the kneading procedure. Maltol was then added in the proportion as shown in Table 1 and the mixture was freed from water to yield a gum base. The sugarless chewing gum samples were prepared from the resulting gum base in a conventional manner and organoleptically evaluated for their quality of sweetness, the result of which is also shown in Table 1.

TABLE 1

| Gum Base Materials | | 1 | 2 | 3 | 4 | 5 | 6 |
| --- | --- | --- | --- | --- | --- | --- | --- |
| Natural Resin | 25–40 | | | | | | |
| Vinyl Acetate Resin | 15–25 | | | | | | |
| Rubber Component | 8–12 | 100 | 99.7 | 98.7 | 97.4 | 95 | 90 |
| Emulsifier | 1–5 | | | | | | |
| Wax | 12–25 | | | | | | |
| Filler (CaCO₃/talc) | 15–25 | | | | | | |
| Amino Acid & Peptides | | — | 0.25 | 0.25 | 0.5 | 1.0 | 2.0 |
| Xylose | | — | 0.05 | 0.05 | 0.1 | 0.2 | 0.4 |
| Maltol | | — | — | 1.00 | 2.0 | 3.8 | 7.6 |
| Total | | 100 | 100 | 100 | 100 | 100 | 100 |
| Organoleptic evaluation (chewing Gum) | | cold sweetness, non-persistent | some sweetness, non-persistent | excellent taste, persistent | good taste, lengthy after-taste | good taste, increased astringency | strong astringency, increased bitterness |
| Grade (Chewing Gum) | | 5 | 4 | 1 | 2 | 3 | 6 |

EXAMPLE 2

Direct addition of the amino-carbonyl reaction product upon preparation of the chewing gum Three parts by weight of glycine as amino acid and 0.2 parts by weight of xylose as sugar together with 7 parts by weight of gelatin hydrolyzate were dissolved in 50 parts by weight of water and heated at 170° C. for 240 minutes to cause the amino-carbonyl reaction, thereafter 40 parts by weight of maltol was added to the mixture, which in turn was evaporated to give the dry amino-carbonyl reaction product.

Thus-obtained amino-carbonyl reaction product together with other conventional chewing gum additives were incorporated and kneaded into the conventional gum base in the compounding proportions as shown in Table 2 to prepare sugarless chewing gums, which were organoleptically evaluated. The result of evaluation is also shown in Table 2.

TABLE 2

|  | 1 | 2 | 3 | 4 | 5 | 6 | 7 |
|---|---|---|---|---|---|---|---|
| Gum Base | 25 | " | " | " | " | " | " |
| Sorbitol | 50 | " | " | " | " | " | " |
| Mannitol | 5 | " | " | " | " | " | " |
| 70% sorbitol | 8 | " | " | " | " | " | " |
| Liquid Malbit | 8 | " | " | " | " | " | " |
| Amino-Carbonyl Reaction Product | — | 0.025 | 0.2 | 0.5 | 1.0 | 2.0 | 3.0 |
| Flavor | 1 | " | " | " | " | " | " |
| Others | 3 | 2.975 | 2.8 | 2.5 | 2.0 | 1.0 | — |
| Total | 100 | 100 | 100 | 100 | 100 | 100 |  |
| Organoleptic Evaluation | cold sweetness, non-persistent | excellent taste | good taste, some lengthy after-taste | good taste, after-taste with astringency | strong astringency with some bitterness | strong astringency and bitterness |  |
| Grade | 6 | 5 | 1 | 2 | 3 | 4 | 7 |

From the result, especially grade shown in Table 2 it will be appreciated that the lower limit of 0.025% to the upper limit of 2.0% of the amino-carbonyl reaction product has a good effect on the flavor and taste of sugarless chewing gum.

ORGANOLEPTIC TEST

Other organoleptic tests were made for the following four cases I to IV with a panel comprising 100 persons and gave the following respective results. In these tests, the chewing gums using amino-carbonyl reaction products were evaluated for the quality and the fondness by means of Two Points Preference Test Method which is well-known to those skilled in the art.

I. In case of formation of amino-carbonyl reaction product during preparation of the gum base for sugarless chewing gum.

|  | Control | A.C. reaction product | No difference | Total |
|---|---|---|---|---|
| Panel members | 11 | 76 | 13 | 100 |

II. In case of direct addition of the amino-carbonyl reaction product upon preparation of the sugarless chewing gum.

|  | Control | A.C. reaction product | No difference | Total |
|---|---|---|---|---|
| Panel members | 4 | 85 | 11 | 100 |

III. In case of direct addition of the amino-carbonyl reaction product upon preparation of the sugar-containing chewing gum.

|  | Control | A.C. reaction product | No difference | Total |
|---|---|---|---|---|
| Panel members | 11 | 67 | 21 | 100 |

IV. Comparison between the cases I and II

|  | Case I | Case II | No difference | Total |
|---|---|---|---|---|
| Panel members | 28 | 62 | 10 | 100 |

In the above tests, the value of the panel members shows the number of persons who answered "good" in sweetness and taste after having chewed the sample.

As apparent from the foregoing organoleptic tests, the amino-carbonyl reaction product has a significantly better effect on the chewing gum (Organoleptic tests I to III).

Further, as shown in Test IV, the amino-carbonyl reaction product has more significant effect for the case in which the reaction product is formed during preparation of the gum base than for the case in which the reaction product is added to the gum base upon preparation of the chewing gum.

EXAMPLE 3

The amino-carbonyl reaction products were obtained in the same procedure as in Example 2 except that one reactants for the amino-carbonyl reaction, amino acids, were varied. Then, the sugarless chewing gums were prepared in the same procedure as in Example 2, using the amino-carbonyl reaction product obtained. Evaluation were made in five grades for the quality of thus-prepared sugarless chewing gum, the result of which is shown in Table 3.

TABLE 3

| Glycine | 0 |  |  |  |  |  |  |  |  |
|---|---|---|---|---|---|---|---|---|---|
| L-Alanine |  | 0 |  |  |  |  |  |  |  |
| L-Arginine |  |  | 0 |  |  |  |  |  |  |
| L-Asparagine |  |  |  | 0 |  |  |  |  |  |
| L-Aspartic acid |  |  |  |  | 0 |  |  |  |  |
| L-Cystein |  |  |  |  |  | 0 |  |  |  |
| L-Cystine |  |  |  |  |  |  | 0 |  |  |
| L-Glutamic acid |  |  |  |  |  |  |  | 0 |  |
| L-Glutamine |  |  |  |  |  |  |  |  | 0 |
| L-Histidine |  |  |  |  |  |  |  |  | 0 |

TABLE 3-continued

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| L-Oxylysine | | | | | | | | | | | 0 | | | | | | | | | | | | |
| L-Oxyproline | | | | | | | | | | | | 0 | | | | | | | | | | | |
| Isoleusine | | | | | | | | | | | | | 0 | | | | | | | | | | |
| L-Leusine | | | | | | | | | | | | | | 0 | | | | | | | | | |
| L-Lysine | | | | | | | | | | | | | | | 0 | | | | | | | | |
| L-Methionine | | | | | | | | | | | | | | | | 0 | | | | | | | |
| L-Phenylalanine | | | | | | | | | | | | | | | | | 0 | | | | | | |
| L-Proline | | | | | | | | | | | | | | | | | | 0 | | | | | |
| L-Serine | | | | | | | | | | | | | | | | | | | 0 | | | | |
| L-Threonine | | | | | | | | | | | | | | | | | | | | 0 | | | |
| L-Tryptophane | | | | | | | | | | | | | | | | | | | | | 0 | | |
| L-Tyrosine | | | | | | | | | | | | | | | | | | | | | | 0 | |
| L-Valine | | | | | | | | | | | | | | | | | | | | | | | 0 |
| Xylose | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Maltol | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Gelatin Hydrolyzate | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Evaluation | 5 | 4 | 3 | 3 | 1 | 1 | 2 | 1 | 2 | 2 | 1 | 2 | 2 | 3 | 1 | 1 | 3 | 2 | 3 | 1 | 3 | 3 | 4 |

5: Good
4: Rather Good
3: Medium
2: Rather Bad
1: Bad

As shown in Table 3, glycine, L-alanine or L-valine is preferred as an amino acid for the amino-carbonyl reaction.

In the foregoing the invention is illustrated for the preferred embodiments but it will be appreciated that a mixture of various amino acids and a mixture of various sugars may be used for the amino-carbonyl reaction or the amino-carbonyl reaction product may be used as one component of raw materials for preparation of the gum base in stead of causing the amino-carbonyl reaction during preparation of the gum base, and that various modifications may be made without departing from the scope of the invention.

What is claimed is:

1. In a chewing gum composition having enhanced sweetness and taste which comprises a conventional gum base including natural resins, vinyl acetate resin, a rubber component, emulsifiers, wax, fillers sweetening agents, flavors, coloring agents, preservatives, all ingredients being present in effective proportions, the improvement which consists of from 0.025 to 5.0% by weight, based on the total weight of chewing gum composition, of an amino-carbonyl reaction product obtained by reaction of at least one amino acid with a least one sugar.

2. A chewing gum composition as claimed in claim 1, wherein said composition further contains maltol and/or protein hydrolyzate.

3. A chewing gum composition as claimed in claim 1, wherein the sugar to be reacted with amino acids is xylose.

4. A chewing gum composition as claimed in claim 1, wherein said composition contains 0.025 to 2.0% by weight of amino-carbonyl reaction product based on the weight of the composition.

5. A chewing gum composition as claimed in claim 1, wherein the chewing gum contains no conventional sweetening agents.

6. In a method of preparing a chewing gum composition having enhanced sweetness and taste which comprises forming a conventional gum base including natural resins, vinyl acetate resin, a rubber component, emulsifiers, wax and fillers, all ingredients being present in effective proportions, wherein the improvement consists in forming an amino-carbonyl reaction product therein by mixing and dissolving therein a mixture of from 0.001 to 5.6% by weight of at least one amino acid and from 0.001 to 0.7% by weight of at least one sugar, the percentages being based on the weight of chewing gum composition, at a temperature of not higher than 150° C., and thereafter adding, in effective proportions, conventional additives comprising one or more of sweetening agents, flavors, coloring agents and preservatives while kneading the whole mixture at a temperature of about 40° to 60° C.

7. A method as claimed in claim 6, wherein the amino-carbonyl reaction product is formed in coexistence of sugars and amino acids with maltol and/or protein hydrolyzate.

8. A method as claimed in claim 6, wherein the sugar to be reacted with amino acids is xylose.

9. In a method of preparing a chewing gum composition having enhanced sweetness and taste which comprises forming a conventional gum base including natural resins, vinyl acetate resin, a rubber component, emulsifiers, wax and fillers all ingredients being present in effective proportions, wherein the improvement consists in mixing therein from 0.025 to 4.0% by weight, based on the total weight of chewing gum composition, of an amino-carbonyl reaction product obtained by reaction of at least one amino acid with at least one sugar, together with, in effective proportions, conventional additives comprising one or more of sweetening agents, flavors, coloring agents and preservatives, by kneading the whole mixture at a temperature of about 40° to 60° C.

10. A method as claimed in claim 9 wherein the amino-carbonyl reaction product is formed in coexistence of sugars and amino acids with maltol and/or protein hydrolyzate.

11. A method as claimed in claim 9, wherein the sugar to be reacted with amino acids is xylose.

12. A method as claimed in claim 6, wherein the amount of the amino-carbonyl reaction product formed is 0.025 to 2.0% by weight, based on the weight of chewing gum composition.

13. A method as claimed in claim 6, wherein the chewing gum contains no conventional sweetening agents.

* * * * *